(12) United States Patent
Yao et al.

(10) Patent No.: US 12,451,109 B2
(45) Date of Patent: Oct. 21, 2025

(54) MUFFLER ASSEMBLY AND NEW ENERGY DEVICE

(71) Applicant: Sungrow Power Supply Co., Ltd., Hefei (CN)

(72) Inventors: Qi Yao, Hefei (CN); Jie Zhou, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 330 days.

(21) Appl. No.: 18/108,158

(22) Filed: Feb. 10, 2023

(65) Prior Publication Data
US 2024/0005898 A1    Jan. 4, 2024

(30) Foreign Application Priority Data
Jun. 30, 2022   (CN) .......................... 202221704726.X

(51) Int. Cl.
*G10K 11/162*   (2006.01)
(52) U.S. Cl.
CPC .................................. *G10K 11/162* (2013.01)
(58) Field of Classification Search
CPC .................................................... G10K 11/162
USPC ........................................................ 181/224
See application file for complete search history.

(56) References Cited

U.S. PATENT DOCUMENTS

| | | | |
|---|---|---|---|
| 4,385,678 A * | 5/1983 | Cederbaum | F02B 77/13 |
| | | | 181/204 |
| 5,625,172 A * | 4/1997 | Blichmann | F02M 35/1266 |
| | | | 181/204 |
| 6,342,005 B1 * | 1/2002 | Daniels | F24F 13/24 |
| | | | 454/906 |
| 9,791,166 B2 * | 10/2017 | Rainey | F24F 13/24 |
| 10,411,556 B1 * | 9/2019 | Sakaray | F02B 77/11 |
| 11,566,466 B2 * | 1/2023 | Dahl | E06B 5/20 |
| 2008/0230305 A1 * | 9/2008 | Goto | G06F 1/182 |
| | | | 181/224 |

(Continued)

FOREIGN PATENT DOCUMENTS

| | | |
|---|---|---|
| CN | 107726518 A | 2/2018 |
| CN | 214787614 A | 11/2021 |

(Continued)

OTHER PUBLICATIONS

EP23156340.4, OCt. 31, 2023, Ectended European Search Report.
Extended European Search Report for European Application No. 23156340.4, dated Oct. 31, 2023.

*Primary Examiner* — Forrest M Phillips
(74) *Attorney, Agent, or Firm* — Wolf, Greenfield & Sacks, P.C.

(57) ABSTRACT

A muffler assembly and a new energy device are disclosed according to the present disclosure. The muffler assembly includes a muffler unit including a side plate and a partition plate. The side plate includes an upper side plate and a lower side plate which are oppositely arranged. The partition plate includes a first partition plate, a second partition plate and a third partition plate, the first partition plate and the third partition plate are connected to the lower side plate, the second partition plate is connected to the upper side plate and arranged between the first partition plate and the third partition plate. A first muffler channel, a second muffler channel, and a third muffler channel are formed.

11 Claims, 6 Drawing Sheets

(56) References Cited

U.S. PATENT DOCUMENTS

| | | | | |
|---|---|---|---|---|
| 2009/0133957 A1* | 5/2009 | Owens | ................... | E04F 17/04 |
| | | | | 181/224 |
| 2010/0078258 A1* | 4/2010 | Tanabe | ................. | G10K 11/172 |
| | | | | 181/224 |
| 2011/0168482 A1* | 7/2011 | Merchant | ................ | F02C 7/045 |
| | | | | 181/224 |
| 2020/0200084 A1 | 6/2020 | Desjoyeaux et al. | | |
| 2022/0205385 A1 | 6/2022 | Wang et al. | | |

FOREIGN PATENT DOCUMENTS

| | | |
|---|---|---|
| DE | 2158702 A1 | 6/1973 |
| EP | 4 019 747 A1 | 6/2022 |
| GB | 1 369 524 A | 10/1974 |
| WO | WO 2019/043344 A1 | 3/2019 |

* cited by examiner

MUFFLER ASSEMBLY AND NEW ENERGY DEVICE

FIELD

The present disclosure relates to the technical field of new energy device, and in particular to a muffler assembly and a new energy device.

BACKGROUND

In most of the existing new energy devices, such as photovoltaic devices and inverters, a certain electromagnetic noise will be generated by internal components provided therein, such as reactors, during operation, which will cause certain harm to users' health when they are used for a long time.

For this, in the existing new energy devices, most of the noise generated is absorbed by mounting sound-absorbing materials inside a machine body. However, in the existing new energy devices, in order to meet the heat dissipation requirements, an air inlet duct and an air outlet duct for heat dissipation to the internal components are usually formed in the machine body, and sound-absorbing materials cannot be well arranged on the air ducts, which leads to noise leakage from the air duct, affecting the overall silencing effect of new energy device.

SUMMARY

A main object of the present disclosure is to provide a muffler assembly, aiming to reduce the noise leakage of new energy device and further improves the overall silencing effect of new energy device.

In order to achieve the above object, the muffler assembly provided by the present disclosure includes a muffler unit, the muffler unit includes a side plate and a partition plate, and the side plate includes an upper side plate and a lower side plate which are oppositely arranged; the partition plate includes a first partition plate, a second partition plate and a third partition plate, the first partition plate and the third partition plate are connected to the lower side plate, the second partition plate is connected to the upper side plate and arranged between the first partition plate and the third partition plate. A first muffler channel is formed by enclosure of the first partition plate and the second partition plate, a second muffler channel is formed by enclosure of the first partition plate, the third partition plate and the lower side plate, and a third muffler channel is formed by enclosure of the second partition plate and the third partition plate, the first muffler channel, the second muffler channel and the third muffler channel are sequentially in communication, and a cross-sectional area of the first muffler channel and a cross-sectional area of the third muffler channel are both less than a cross-sectional area of the second muffler channel.

In an embodiment, the muffler assembly includes at least two muffler units, at least two of the muffler units are connected side by side in sequence; a fourth muffler channel is formed by enclosure of the second partition plate and the upper side plate of any two adjacent muffler units, the fourth muffler channel is in communication with the third muffler channel of one muffler unit and the first muffler channel of another muffler unit.

The fourth muffler channel is arranged opposite to the second muffler channel, and the cross-sectional area of the first muffler channel and the cross-sectional area of the third muffler channel are both less than a cross-sectional area of the fourth muffler channel.

In an embodiment, a channel inlet is formed by enclosure of one end of the upper side plate and one end of the first partition plate facing away from the lower side plate, a channel outlet is formed by enclosure of the other end of the upper side plate and one end of the third partition plate facing away from the lower side plate. In two adjacent muffler units, the channel inlet of one muffler unit is in communication with the channel outlet of the other muffler unit. And/or, in two adjacent muffler units, the third partition plate of any one muffler unit and the first partition plate of the other muffler unit have an integrated structure.

In an embodiment, at least one of the first partition plates, the second partition plate and the third partition plate is provided with a sound insulation plate, the sound insulation plate is arranged in the first muffler channel and/or the third muffler channel.

In an embodiment, a surface of the second partition plate facing the first partition plate is provided with the sound insulation plate, a surface of the third partition plate facing the second partition plate is provided with the sound insulation plate.

In an embodiment, the sound insulation plate is rotatably connected to the second partition plate and the third partition plate, and the sound insulation plate is fixed with the second partition plate and the third partition plate in a position-limitation manner when rotating to a certain angle.

In an embodiment, the muffler unit is further provided with a sound-absorbing layer, the sound-absorbing layer is arranged on the upper side plate and the bottom plate, and faces the lower side plate.

In an embodiment, the sound-absorbing layer is attached to the upper side plate and the lower side plate. And/or, the sound-absorbing layer is made of sound insulation cotton. And/or, the cross-sectional area of the first muffler channel is the same as the cross-sectional area of the third muffler channel.

In an embodiment, the muffler assembly further includes a mounting frame, the mounting frame is formed with an accommodating chamber, and the muffler unit is mounted in the accommodating chamber.

A new energy device is further provided according to the present disclosure, which includes a machine body and a muffler assembly, the muffler assembly is mounted on the machine body and covers the air inlet and the air outlet of the machine body. The muffler assembly includes a muffler unit, the muffler unit includes a side plate and a partition plate, and the side plate includes an upper side plate and a lower side plate which are oppositely arranged; the partition plate includes a first partition plate, a second partition plate and a third partition plate, the first partition plate and the third partition plate are connected to the lower side plate, the second partition plate is connected to the upper side plate and arranged between the first partition plate and the third partition plate. A first muffler channel is formed by enclosure of the first partition plate and the second partition plate, the first partition plate, a second muffler channel is formed by enclosure of the third partition plate and the lower side plate, a third muffler channel is formed by enclosure of the second partition plate and the third partition plate, the first muffler channel, the second muffler channel and the third muffler channel are sequentially in communication, and a cross-sectional area of the first muffler channel and a cross-sectional area of the third muffler channel are both less than a cross-sectional area of the second muffler channel.

According to the technical solution of the present disclosure, the muffler assemblies are arranged at the air inlet duct and the air outlet duct of the new energy device, and a first muffler channel, a second muffler channel and a third muffler channel are formed by enclosure of the side plates and the partition plates. Since a cross-sectional area of the first muffler channel and a cross-sectional area of the third muffler channel are both less than a cross-sectional area of the second muffler channel, when the noise propagates from the first muffler channel to the second muffler channel and from the second muffler channel to the third muffler channel, due to the abrupt variation of the cross-sectional area of the channel, the impedance of the acoustic wave of the noise is not matched and a reflection occurs, and the intensity of the noise is attenuated, thus achieving a certain silencing effect. In this way, the sound energy of the noise leaked through the air inlet duct and the air outlet duct of the new energy device can be greatly reduced under the action of the muffler assembly, thereby reducing the outward radiation and transmission of noise, reducing the noise leakage of new energy device, and further improving the overall silencing effect of new energy device.

BRIEF DESCRIPTION OF THE DRAWINGS

For more clearly illustrating embodiments of the present disclosure or the technical solutions in the conventional technology, drawings referred to describe the embodiments or the conventional technology will be briefly described hereinafter. Apparently, the drawings in the following description are only some examples of the present disclosure, and for those skilled in the art, other drawings may be obtained based on these drawings without any creative efforts.

Figure 1:
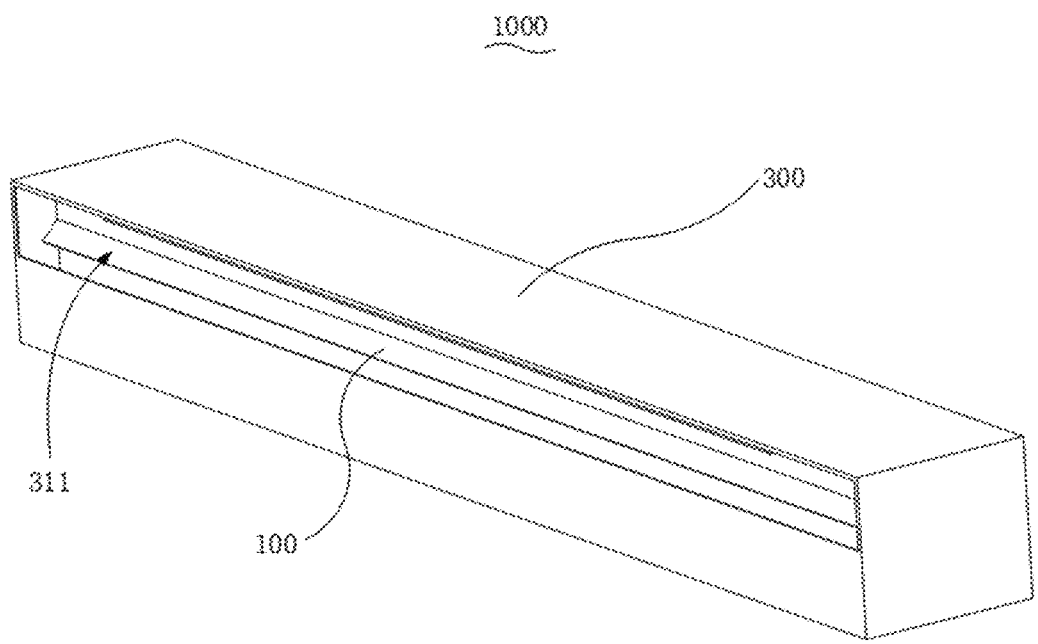
FIG. 1 is a three-dimensional structural diagram of an embodiment of a muffler assembly of the present disclosure.

Reference numerals in the drawings are as follows:

| Reference Numeral | Name | Reference Numeral | Name |
| --- | --- | --- | --- |
| 1000 | Muffler assembly | 351 | Channel outlet |
| 100 | Muffler unit | 51 | First muffler channel |
| 11 | Upper side plate | 53 | Second muffler channel |
| 13 | Lower side plate | 55 | Third muffler channel |
| 31 | First partition plate | 57 | Fourth muffler channel |
| 311 | Channel inlet | 70 | Sound insulation plate |
| 33 | Second partition plate | 90 | Sound-absorbing layer |
| 35 | Third partition plate | 300 | Mounting frame |

The realization of the objects, functional characteristics and advantages of the present disclosure will be further described in conjunction with the embodiments and with reference to the drawings.

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments of the present disclosure, all other embodiments obtained by those having ordinary skill in the art without creative work shall fall within the protection scope of the present disclosure.

In the existing new energy devices, most of the noise generated is absorbed by mounting sound-absorbing materials inside a machine body. However, in the existing new energy devices, in order to meet the heat dissipation requirements, an air inlet duct and an air outlet duct for heat dissipation to the internal components are usually formed in the machine body, and sound-absorbing materials cannot be well arranged on the air ducts, which leads to noise leakage from the air duct, affecting the overall silencing effect of new energy device. In view of the above problems, a muffler assembly 1000 is provided according to the present disclosure.

Referring to FIG. 1 to FIG. 8, in the embodiment of the present disclosure, the muffler assembly 1000 includes a muffler unit 100, the muffler unit 100 includes a side plate and a partition plate, and the side plate includes an upper side plate 11 and a lower side plate 13 which are oppositely arranged; the partition plate includes a first partition plate 31, a second partition plate 33 and a third partition plate 35, the first partition plate 31 and the third partition plate 35 are connected to the lower side plate 13, the second partition plates 33 are connected to the upper side plate 11 and arranged between the first partition plate 31 and the third partition plate 35. A first muffler channel 51 is formed by enclosure of the first partition plate 31 and the second partition plate 33, a second muffler channel 53 is formed by enclosure of the first partition plate 31, the third partition plate 35 and the lower side plate 13, and a third muffler channel 55 is formed by enclosure of the second partition plate 33 and the third partition plate 35. The first muffler channel 51, the second muffler channel 53 and the third muffler channel 55 are sequentially in communication, and a cross-sectional area of the first muffler channel 51 and a cross-sectional area of the third muffler channel 55 are both less than a cross-sectional area of the second muffler channel 53.

According to the technical solution of the present disclosure, the muffler assembly 1000 are arranged at the air inlet duct and the air outlet duct of the new energy device, and a first muffler channel 51, a second muffler channel 53 and a third muffler channel 55 are formed by enclosure of the side plates and the partition plates. Since the cross-sectional area of the first muffler channel 51 and the cross-sectional area of the third muffler channel 55 are both less than the cross-sectional area of the second muffler channel 53, and thus when the noise propagates from the first muffler channel 51 to the second muffler channel 53 and from the second muffler channel 53 to the third muffler channel 55, due to an abrupt variation of the cross-sectional area of the channel, the impedance of the noise sound wave is mismatched and thus reflection occurs, and the intensity of the noise is attenuated, thus achieving a certain silencing effect (the specific noise propagation path can be referred to FIG. 4, FIG. 6 and FIG. 8, in which dashed lines with arrows represent the transmission and reflection of noise in the muffler channel). In this way, the sound energy of the noise leaked through the air inlet duct and the air outlet duct of the new energy device can be greatly reduced under the action of the muffler assembly 1000, thereby reducing the outward radiation and transmission of noise, reducing the noise leakage of new energy device, and further improving the overall silencing effect of new energy device.

It can be understood that the first muffler channel 51 can be used to be in communication with the heat dissipation device of the new energy device, that is to say, the first muffler channel 51 is in communication with the accommodation space for accommodating the heat sink, and the third muffler channel 55 can be used to be in communication with the outside. The first muffler channel 51 and the second muffler channel 53 may be directly connected, and alternatively, a transition section may also be provided between the first muffler channel and the second muffler channel. Similarly, the second muffler channel 53 and the third muffler channel 55 may be directly connected, and alternatively, a transition section may be provided between the second muffler channel and the third muffler channel. The cross sections of the first muffler channel 51, the second muffler channel 53 and the third muffler channel 55 can be square or round, etc., so that the shape of the muffler channels are more regular, which facilitates of improving the convenience of processing and molding. Of course, the present disclosure is not limited to this, in other embodiments, the cross sections of the first muffler channel 51, the second muffler channel 53 and the third muffler channel 55 may also be triangular or other shapes. In addition, the heat dissipation device of the new energy device can be a heat-dissipation fan, which provides a driving force, so that the external cooling air can be better driven to enter the muffler channel through the third muffler channel 55, and then flow out through the first muffler channel 51 to enter the new energy device, and then the cooling air exchanges heat with the electrical components of the new energy device to further improve the heat dissipation effect of the new energy device. Of course, the present disclosure is not limited to this, in other embodiments, the heat dissipation device can also be a refrigeration semiconductor or a refrigeration compressor and other devices that can be used for heat dissipation.

Figure 2:
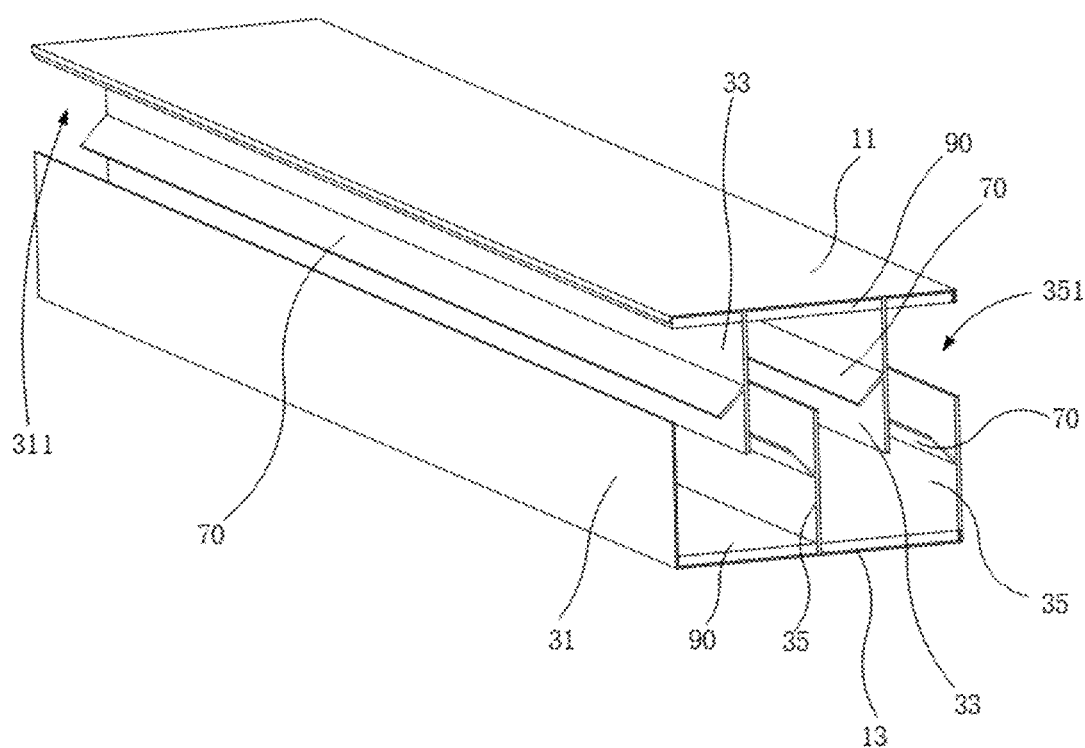
FIG. 2 is an internal structure diagram of the embodiment of the muffler assembly of FIG. 1.
Figure 3:
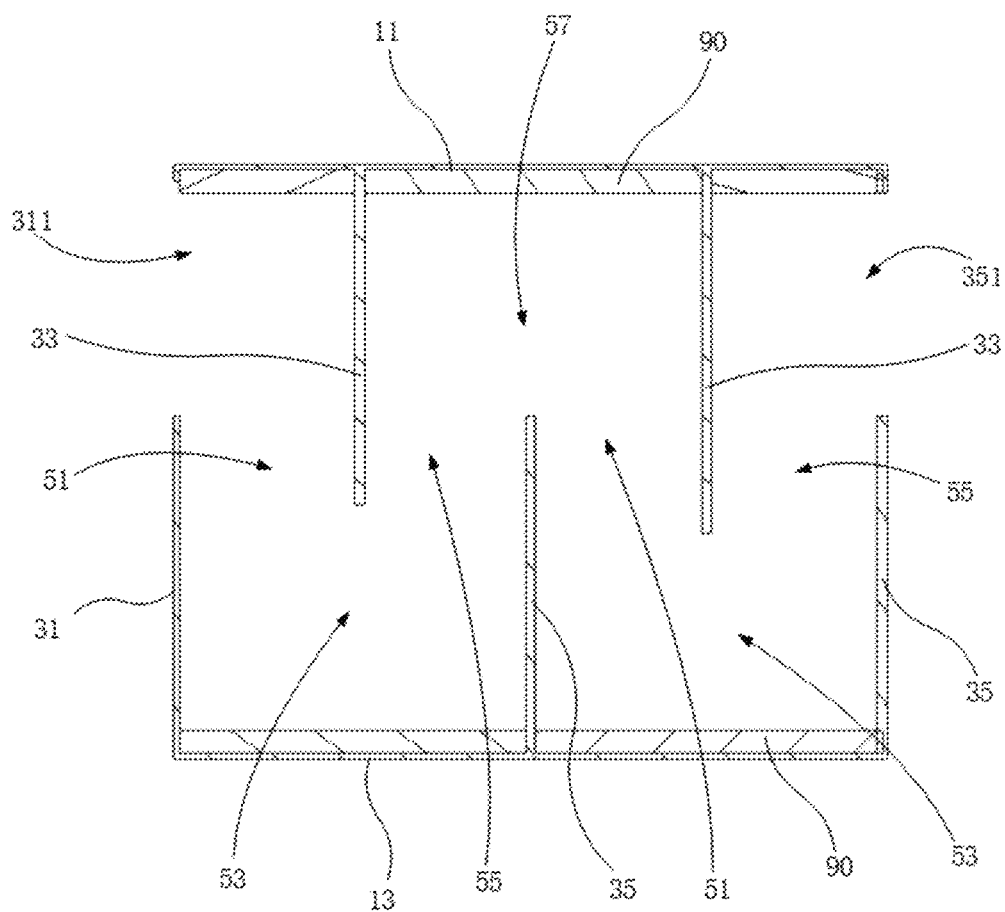
FIG. 3 is a cross-sectional view of the embodiment of the muffler assembly of FIG. 2.
Figure 4:
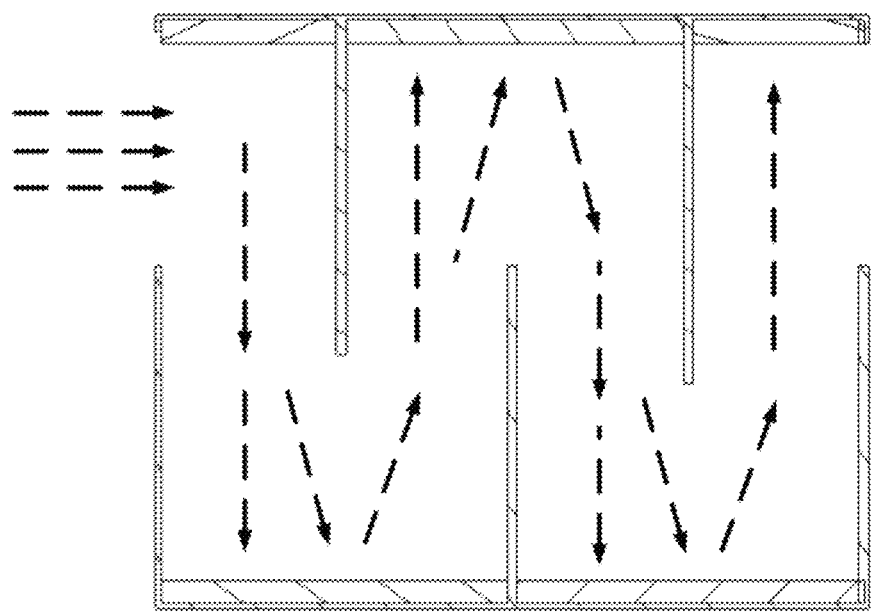
FIG. 4 is a propagation path diagram of noise in the muffler assembly of an embodiment of FIG. 3.
Figure 5:
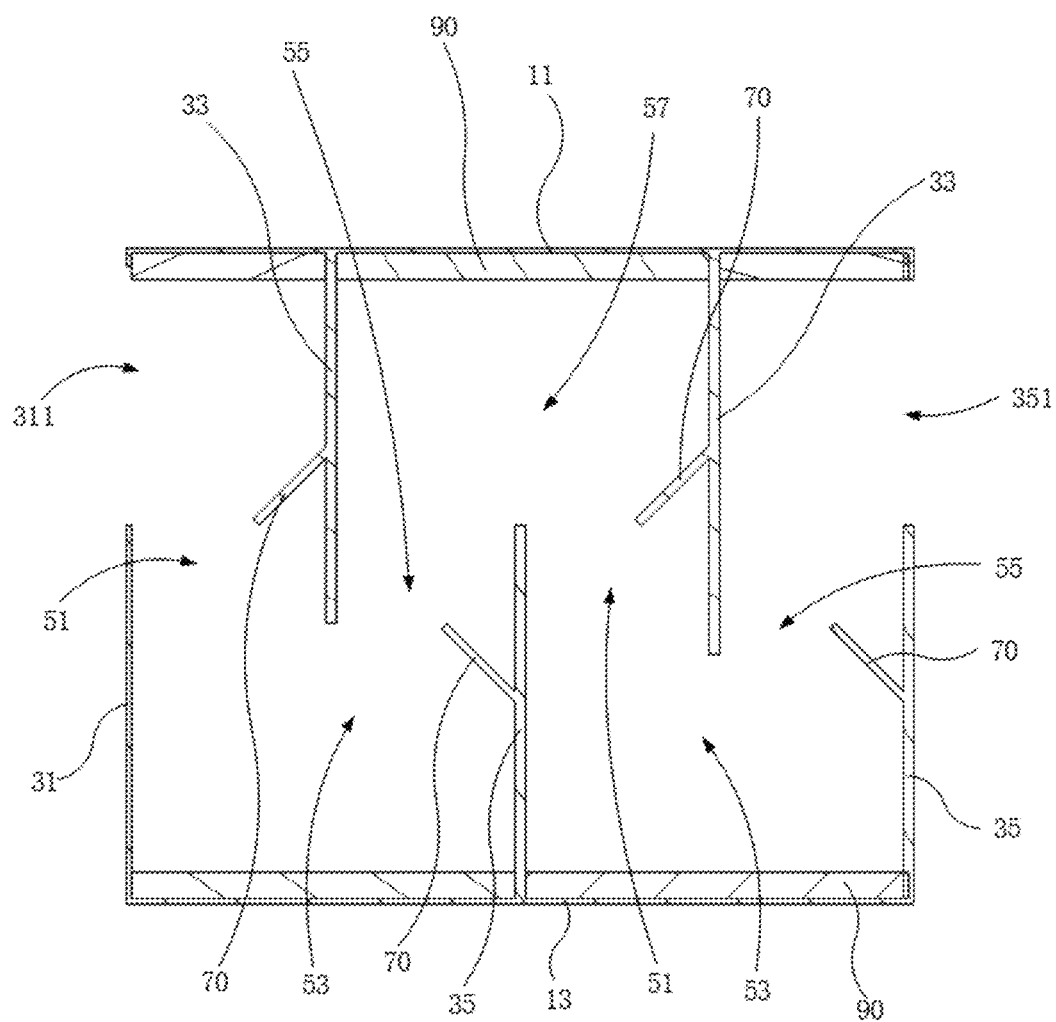
FIG. 5 is a cross-sectional view of an embodiment in which the muffler assembly of FIG. 2 is provided with a sound insulator.

Referring to FIG. 2, FIG. 3 and FIG. 5, in an embodiment of the present disclosure, the muffler assembly 1000 includes at least two muffler units 100, which are connected side by side; a fourth muffler channel 57 is formed by enclosure of the second partition plate 33 and the upper side plate 11 of any two adjacent muffler units 100, and the fourth muffler channel 57 is in communication with the third muffler channel 55 of one muffler unit 100 and with the first muffler channel 51 of another muffler unit 100. The fourth muffler channel 57 is arranged opposite to the second muffler channel 53, and the cross-sectional area of the first muffler channel 51 and the cross-sectional area of the third muffler channel 55 are both less than a cross-sectional area of the fourth muffler channel 57.

In this embodiment, the muffler assembly 1000 includes multiple muffler units 100, the noise can be transmitted through the muffler channels of the multiple muffler units 100 in sequence, and the sound energy of the noise can be further attenuated in the process of transmission through the muffler units 100, thereby further improving the silencing effect of the muffler assembly 1000. The fourth muffler channel 57 is formed at the interconnection of two adjacent muffler units 100, the cross-sectional area of the fourth muffler channel 57 is greater than both the cross-sectional area of the first muffler channel 51 and the cross-sectional area of the third muffler channel 55, so that, when the noise attenuated by a muffler unit 100 propagates from the third muffler channel 55 toward the fourth muffler channel 57, due to the abrupt variation of the cross-sectional area of the channel, the acoustic impedance of the noise is not matched again and reflection occurs in the fourth muffler channel 57; Similarly, when the noise propagates from the fourth muffler channel 57 to the first muffler channel 51 of another muffler unit 100, the abrupt variation of the cross-sectional area of the channel also causes the reflection of the noise, and thus the overall structure of the muffler assembly 1000 is fully utilized for silencing treatment, which further improves the silencing effect and a sound attenuation rate of the muffler assembly 1000.

In addition, by providing the fourth muffler channel 57, any two connected muffler units 100 can form multiple expansion chamber structures that are staggered and arranged in series, the noise can cause reflection of sound waves when entering and leaving any of the first muffler channels 51 and the third muffler channels 55, which further accelerates the noise attenuation. By oppositely arranging the fourth muffler channel 57 and the second muffler channel 53, multiple expansion chambers can be staggered from top to bottom in sequence, so that a muffler channel being zigzag is formed in the muffler assembly 1000, which is beneficial to enhance the reflection amplitude and frequency of noise, and the noise can be sufficiently attenuated, thereby further improving the overall silencing effect of the muffler assembly 1000, and improving the practicability and reliability of the muffler assembly 1000.

Figure 7:
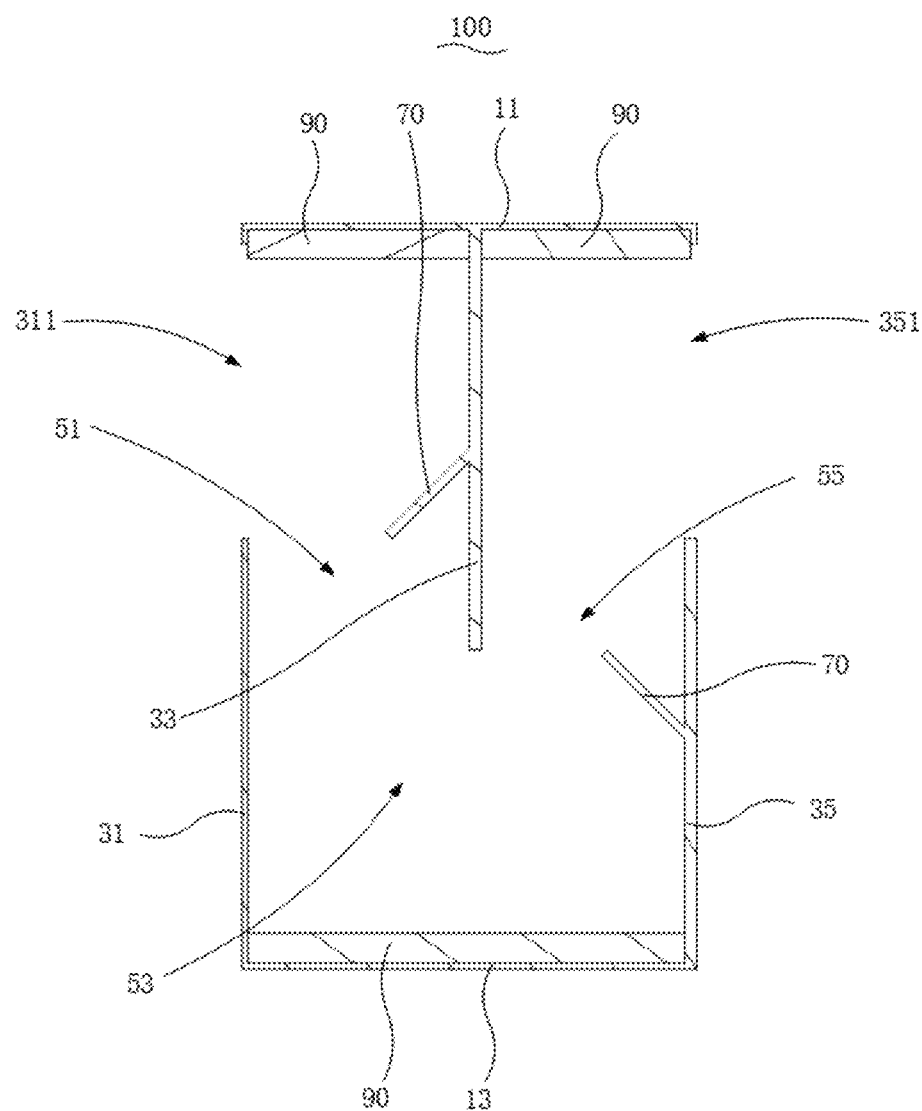
FIG. 7 is a sectional view of an embodiment of a muffler unit of the muffler assembly of FIG. 1.
Figure 8:
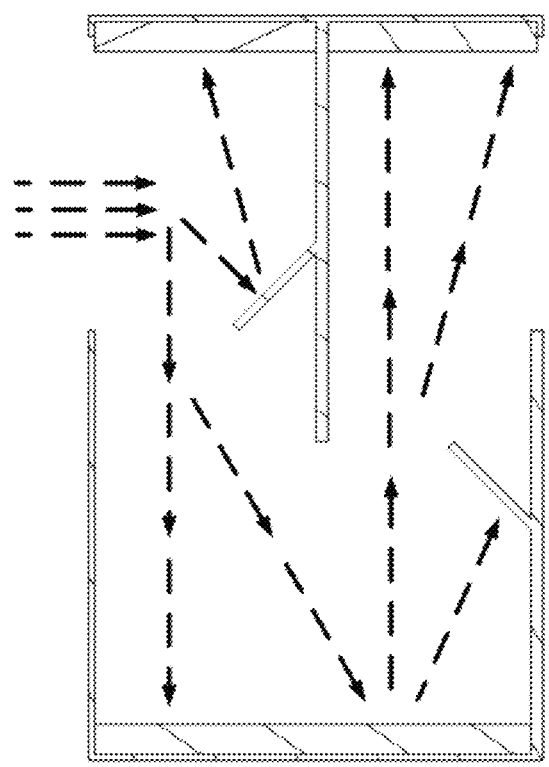
FIG. 8 is a propagation path diagram of noise propagation in the muffler unit of an embodiment of FIG. 7.

Further, referring to FIG. 3, FIG. 5 and FIG. 7, in an embodiment of the present disclosure, a channel inlet 311 is formed by enclosure of one end of the upper side plate 11 and the end of the first partition plate 31 facing away from the lower side plate 13, and a channel outlet 351 is formed by enclosure of the other end of the upper side plate 11 and the end of the third partition plate 35 facing away from the lower side plate 13. The channel inlet 311 of any one muffler unit 100 is in communication with the channel outlet 351 of the other muffler unit 100 in two adjacent muffler units. And/or, the third partition plate 35 of any one muffler unit 100 and the first partition plate 31 of the other muffler unit 100 have an integrated structure in two adjacent muffler units.

In this embodiment, the channel inlet 311 and the channel outlet 351 are enclosed by the side plate and the partition plate, the channel inlet 311 can be configured to directly communicate the new energy device with the first muffler channel, and the third muffler channel is directly in communication with the outside through the channel outlet 351, which further improves the ventilation rate of the muffler assembly, and facilitates the noise of entering the muffler assembly for silencing treatment. The channel inlet 311 can be directly in communication with the first muffler channel 51, and the channel outlet 351 can be directly in communication with the third muffler channel 55, which is beneficial to ensure the overall ventilation effect of the muffler channel, facilitate of noise transmission, and improve the practicability of the muffler assembly 1000. Of course, transition sections may also be provided between the channel inlet 311 and the first muffler channel 51 and between the channel outlet 351 and the third muffler channel 55, so that the channel inlet 311 can be indirectly in communication with the first muffler channel 51, and the channel outlet 351 can be indirectly in communication with the third muffler channel 55.

Moreover, any two adjacent third partition plates 35 of one muffler unit 100 and the first partition plates 31 of another muffler unit 100 are configured to have an integrated structure, which can improve the integrity of multiple muffler units 100, and is beneficial to further simplify the overall structure of the muffler assembly 1000 and facilitate the lightweight design of the muffler assembly 1000. In addition, it is also beneficial to reduce the installation structure in the muffler assembly 1000, which facilitates of disassembly and maintenance of the muffler assembly 1000, and the integrated design may also reduce the installation and production cost of the muffler assembly 1000, which further improves the practicability of the muffler assembly 1000.

Referring to FIG. 2, FIG. 5 and FIG. 7, in an embodiment of the present disclosure, at least one of the first partition plate 31, the second partition plate 33 and the third partition plate 35 is provide with a sound insulation plate 70, the sound insulation plate 70 is arranged in the first muffler channel 51 and/or the third muffler channel 53.

In this embodiment, by providing the sound insulation plate 70, the propagation of noise in the first muffler channel 51 or the third muffler channel 55 can be further weakened, and the silencing effect of the muffler assembly 1000 can be further improved. The sound insulation plate 70 is arranged in the first muffler channel 51 or the third muffler channel 55, which may affect the transmission zone of the noise in the first muffler channel 51 or the third muffler channel 55, and increase the expansion ratio of noise when entering the second muffler channel 53 from the first muffler channel 51 or entering the third muffler channel 55 from the second muffler channel 53, so that the noise at some frequency bands can be reflected better, and the sound attenuation effect of the muffler assembly 1000 can be further improved. Meanwhile, the sound insulation plate 70 arranged in the first muffler channel 51 or the third muffler channel 55 can function as a sound barrier for noise in a certain extent, so that part of the noise collides with the sound insulation plate 70 during propagation and is reflected or refracted, further improving the attenuation of noise sound energy and achieving a better silencing effect.

The sound insulation plate 70 may be provided on one of the first partition plate 31, the second partition plate 33 and the third partition plate 35. In that case, the sound insulation plate 70 is provided on the portion of the first partition plate 31 or the second partition plate 33 that is located in the first muffler channel 51, or the sound insulation plate 70 may be provided at the part of the third partition plate 35 located in the third muffler channel 55, so that the sound insulation plate 70 has a certain sound attenuation effect on the first muffler channel 51 or the third muffler channel 55. In addition, all the first partition plate 31, the second partition plate 33 and the third partition plate 35 may be provided with sound insulation plates 70. In that case, the sound insulation plate 70 on the first partition plate 31 can be used to influence the noise entering the first muffler channel 51 from outside the muffler unit 100, and the sound insulation plate 70 on the second partition plate 33 may be disposed in the first muffler channel 51, and the sound insulation plate 70 on the third partition plate 35 may be disposed in the third muffler channel 55, thereby further improving the overall silencing effect of the muffler assembly 1000.

Further, referring to FIG. 5 and FIG. 7, in an embodiment of the present disclosure, the surface of the second partition plate 33 facing the first partition plate 31 is provided with the sound insulation plate 70, and the surface of the third partition plate 35 facing the second partition plate 33 is provided with the sound insulation plate 70.

In this embodiment, the first muffler channel 51 and the third muffler channel 55 of the muffler unit 100 are both provided with sound insulation plates 70, so that noise can be further blocked and reflected when entering and leaving the second muffler channel 53 and the expansion ratio of noise propagation can be increased, which further accelerates the sound energy attenuation of the noise in the muffler unit 100 to achieve a better silencing effect. In that case, it is not necessary for the first partition plate 31 to be provided with the sound insulation plate 70, in order to better fit the muffler assembly 1000 to the new energy device for installation, which is beneficial to make the overall structure of the muffler assembly 1000 more simple, and further improve the practicability and reliability of the muffler assembly 1000. In addition, in case that the muffler assembly 1000 is provided with multiple muffler units 100, the sound insulation plate 70 arranged on the third partition plate 35 may also reduce the sound energy of the noise entering the other muffler unit 100 from the third muffler channel 55 of one muffler unit 100, so that the noise can be attenuated or even disappear after being silenced by multiple muffler units 100, thereby further improving the overall silencing effect of the muffler assembly 1000.

Figure 6:
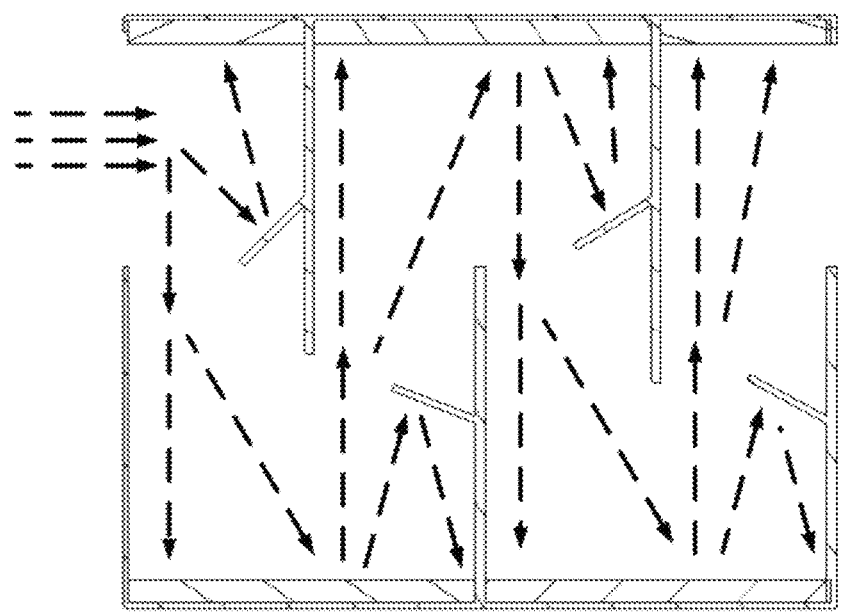
FIG. 6 is a propagation path diagram of noise in the muffler assembly of an embodiment of FIG. 5.

Further, referring to FIG. 6, in an embodiment of the present disclosure, the sound insulation plate 70 is rotatably connected to the second partition plate 33 and the third partition plate 35, and the sound insulation plate is fixed with the second partition plate 33 and the third partition plate 35 in a position-limitation manner when rotating to a certain angle.

In this embodiment, the sound insulation plate 70 is rotatably connected to the second partition plate 33 and the third partition plate 35, a certain included angle can be formed between the sound insulation plate 70 and the second partition plate 33, and between the sound insulation plate 70 and the third partition plate 35, so that the noise can be better reflected in various directions; the size of the channel through which the noise is transmitted through the first muffler channel 51 or the third muffler channel 55 can be adjusted by adjusting the included angle between the sound insulation plate 70 and the second partition plate 33 or the included angle between the sound insulation plate 70 and the third partition plate 35, thereby adjusting the expansion ratio between the first muffler channel 51 and the second muffler channel 53 and the expansion ratio between the third muffler channel 55 and the second muffler channel 53, so that the muffler unit 100 can better silence the noise at a certain frequency band, and achieve a better silencing effect. Furthermore, in case that the muffler assembly 1000 includes multiple muffler units 100, the angle of the sound insulation plate 70 in each muffler unit 100 is adjusted by rotation, the included angle between each sound insulation plate 70 and the second partition plate 33 or the third partition plate 35 is configured to be different, so that it is possible to make the muffler channels in each muffler unit 100 with different expansion ratios, and thus the multiple muffler units 100 of the muffler assembly 1000 can provide a certain silencing effect for noises at different frequency bands. In that case, the silencing effect of the muffler assembly 1000 is more significant, thereby further improving the overall silencing effect of the muffler assembly 1000, and improving the practicability and reliability of the muffler assembly 1000.

The sound insulation plate 70 can be fixed on a pivot, and the pivot is sleeved on the pivot seat of the partition plate to realize the rotation of the sound insulation plate 70. The pivot seat may also be provided with a damping-limiting structure, so that when the sound insulation plate 70 rotates to a certain angle, the pivot can be fixed on the pivot seat in a position-limitation manner by the damping limiting structure, so as to realize the position limiting and fixation of the sound insulation plate 70. In addition, in other embodiments, the sound insulation plate 70 may also be rotatably connected to the second partition plate 33 or the third partition plate 35 by screw transmission or gear rotation.

Referring to FIG. 2, FIG. 3, FIG. 5 and FIG. 7, in an embodiment of the present disclosure, the muffler unit 100 is further provided with a sound-absorbing layer 90, and the sound-absorbing layer 90 is arranged on the upper side plate 11 and the lower side plate 13.

In this embodiment, the sound-absorbing layer 90 may further absorb the noise transmitted into the muffler channel, thus further improving the noise reduction effect of new energy device. Since the noise will propagate more toward the upper side plate 11 and the lower side plate 13 after being reflected, and the sound-absorbing layer 90 is provided on the upper side plate 11 and the lower side plate 13, the reflected or refracted noise can be better absorbed on the upper side plate 11 and the lower side plate 13, which is beneficial to reduce the re-reflection or refraction of noise, and further improve the silencing effect of the muffler channel. In addition, the sound-absorbing layer 90 may also be arranged on the first partition plate 31, the second partition plate 33 and the third partition plate 35, so that the sound-absorbing layer 90 is arranged in the whole muffler channel. The noise can be absorbed by the sound-absorbing layer 90 after being reflected or refracted during its propagation in the muffler channel, so as to fully absorb the noise transferred to the muffler channel.

In an embodiment of the present disclosure, the sound-absorbing layer 90 is attached to the upper side plate 11 and the lower side plate 13. And/or, the sound-absorbing layer is made of sound insulation cotton. And/or, the cross-sectional area of the first muffler channel 31 is the same as the cross-sectional area of the third muffler channel 35.

In this embodiment, the sound-absorbing layer 90 can be fixed by bonding, and there is no need to set a complicated connection structure on the upper side plate 11 and the lower side plate 13, which is beneficial to simplify the overall structure of the muffler assembly 1000. With this arrangement, the connection area of the sound-absorbing layer 90 with the upper side plate 11 and the lower side plate 13 can also be increased, which is beneficial to improve the installation stability of the sound-absorbing layer 90. Of course, the present disclosure is not limited to this, in other embodiments, a clamping member may also be arranged on the upper side plate 11 and the lower side plate 13 to clamp and fix the sound-absorbing layer 90; or the sound-absorbing layer is directly fixed by screws. In addition, in one embodiment, the sound-absorbing layer 90 may be sound insulation cotton. It can be understood that the sound insulation cotton has the advantages of good silencing effect, relatively long service life and relatively low cost, which is beneficial to improve the sound absorbing effect of the sound-absorbing layer 90 and reduce the manufacturing cost. Of course, it should be noted that the present disclosure is not limited to this, in other embodiments, the sound-absorbing layer 90 may be a deadening fabric or the like.

In addition, the cross-sectional area of the first muffler channel 51 is configure to be the same as the cross-sectional area of the third muffler channel 55, which ensures that the external air flow is provided with the same throughput both in the first muffler channel 51 and the third muffler channel 55. In that case, the external cooling air may flow relatively smoothly in the muffler channel, which is beneficial to further ensure the heat dissipation effect on the new energy device. This arrangement also makes the shape of the muffler channel be relatively regular, which is beneficial to improve the convenience of forming the muffler channel. Of course, it should be noted that the present disclosure is not limited to this. In other embodiments, the cross-sectional area of the first muffler channel 51 may be different from the cross-sectional area of the third muffler channel 55.

Referring to FIG. 1, in an embodiment of the present disclosure, the muffler assembly 1000 further includes a mounting frame 300, the mounting frame 300 is provided with an accommodating chamber, and the muffler unit 100 is mounted in the accommodating chamber.

In this embodiment, by mounting the muffler unit 100 in the accommodating chamber, the two end faces of the muffler unit 100 can be blocked by the end plates of the mounting frame 300 and the noise can be better concentrated and transmitted in the muffler channels in the muffler unit 100, which further reduces the noise leakage and improves the overall silencing effect of the muffler assembly 1000. Meanwhile, in case that the muffler assembly 1000 includes multiple muffler units 100, multiple muffler units 100 can be neatly arranged in the mounting frame 300, so that the overall structure of the muffler assembly 1000 is neater and more aesthetic, and it is more convenient to assemble and use. The muffler unit 100 can be assembled by attaching the upper side plate 11 and the lower side plate 13 to the upper and lower opposite inner walls in the accommodating chamber, or the muffler unit can be assembled by means of screw fixation.

A new energy device (not shown) is further provided according to the present disclosure, which includes a machine body (not shown) and a muffler assembly 1000. The muffler assembly 1000 is mounted on the machine body and covers the air inlet and air outlet of the machine body, the specific structure of the muffler assembly 1000 refers to the above embodiments, and since the new energy device adopts all the technical solutions of all the above embodiments, it has at least all the beneficial effects brought by the technical solutions of the above-mentioned embodiments, which are repeated herein.

The above embodiments are only preferred embodiments of the present disclosure, and do not limit the scope of the present disclosure. With the concept of the present disclosure, any equivalent structural transformation made by using the contents of description and drawings of the present disclosure, or direct/indirect implementation in other related technical fields, are included in the protection scope of the present disclosure.

The invention claimed is:

1. A muffler assembly, comprising a muffler unit, wherein the muffler unit comprises:
   a side plate, wherein the side plate comprises an upper side plate and a lower side plate which are oppositely arranged; and
   a partition plate, wherein the partition plate comprises a first partition plate, a second partition plate and a third partition plate, the first partition plate and the third partition plate are connected to the lower side plate, the second partition plate is connected to the upper side plate and arranged between the first partition plate and the third partition plate;
   wherein a first muffler channel is formed by enclosure of the first partition plate and the second partition plate, a second muffler channel is formed by enclosure of the first partition plate, the third partition plate and the lower side plate, and a third muffler channel is formed by enclosure of the second partition plate and the third partition plate, wherein the first muffler channel, the second muffler channel and the third muffler channel are sequentially in communication, and a cross-sectional area of the first muffler channel and a cross-sectional area of the third muffler channel are both less than a cross-sectional area of the second muffler channel,
   wherein at least one of the first partition plate, the second partition plate and the third partition plate is provided with a sound insulation plate, the sound insulation plate is arranged in the first muffler channel and/or the third muffler channel,
   wherein a surface of the second partition plate facing the first partition plate is provided with the sound insulation plate, and a surface of the third partition plate facing the second partition plate is provided with the sound insulation plate,
   wherein the sound insulation plate is rotatably connected to the second partition plate and the third partition plate, and the sound insulation plate is fixed with the second partition plate and the third partition plate in a position-limitation manner when rotating to a certain angle.

2. The muffler assembly according to claim 1, wherein the muffler assembly comprises at least two muffler units, which are connected side by side in sequence;
   wherein a fourth muffler channel is formed by enclosure of the second partition plate and the upper side plate of any two adjacent muffler units, the fourth muffler channel is in communication with the third muffler channel of one muffler unit and the first muffler channel of another muffler unit;
   wherein the fourth muffler channel is arranged opposite to the second muffler channel, and the cross-sectional area of the first muffler channel and the cross-sectional area of the third muffler channel are both less than a cross-sectional area of the fourth muffler channel.

3. The muffler assembly according to claim 2, wherein a channel inlet is formed by enclosure of one end of the upper side plate and one end of the first partition plate facing away from the lower side plate, a channel outlet is formed by enclosure of the other end of the upper side plate and one end of the third partition plate facing away from the lower side plate, wherein, in two adjacent muffler units, the channel inlet of one muffler unit is in communication with the channel outlet of the other muffler unit;
   and/or, in two adjacent muffler units, the third partition plate of any one muffler unit and the first partition plate of the other muffler unit have an integrated structure.

4. The muffler assembly according to claim 1, wherein the muffler unit is further provided with a sound-absorbing layer, which is arranged on the upper side plate and the lower side plate.

5. The muffler assembly according to claim 2, wherein the muffler unit is further provided with a sound-absorbing layer, which is arranged on the upper side plate and the lower side plate.

6. The muffler assembly according to claim 3, wherein the muffler unit is further provided with a sound-absorbing layer, which is arranged on the upper side plate and the lower side plate.

7. The muffler assembly according to claim 4, wherein the sound-absorbing layer is attached to the upper side plate and the lower side plate;
   and/or, the sound-absorbing layer is made of sound insulation cotton;
   and/or, the cross-sectional area of the first muffler channel is the same as the cross-sectional area of the third muffler channel.

8. The muffler assembly according to claim 1, further comprising a mounting frame, wherein the mounting frame is formed with an accommodating chamber, and the muffler unit is mounted in the accommodating chamber.

9. The muffler assembly according to claim 2, further comprising a mounting frame, wherein the mounting frame is formed with an accommodating chamber, and the muffler unit is mounted in the accommodating chamber.

10. The muffler assembly according to claim 3, further comprising a mounting frame, wherein the mounting frame is formed with an accommodating chamber, and the muffler unit is mounted in the accommodating chamber.

11. A new energy device, comprising a machine body and a muffler assembly, wherein the muffler assembly is the muffler assembly described in claim 1, the muffler assembly is mounted in the machine body and covers the air inlet and the air outlet of the machine body.

* * * * *